United States Patent [19]
Schaenzer et al.

[11] Patent Number: 5,856,895
[45] Date of Patent: Jan. 5, 1999

[54] INTERNAL ACCELEROMETER FOR IMPROVED SERVO PERFORMANCE AND SHOCK SENSING ON HIGH PERFORMANCE DISC DRIVE HEADS

[75] Inventors: Mark J. Schaenzer, Eagan; Zine-Eddine Boutaghou, Vadnais Heights; He Huang, Eden Prairie, all of Minn.

[73] Assignee: Seagate Technology, Inc., Scotts Valley, Calif.

[21] Appl. No.: 887,499

[22] Filed: Jul. 2, 1997

[51] Int. Cl.⁶ .............................. G11B 5/60; G11B 21/21
[52] U.S. Cl. ............................................................ 360/103
[58] Field of Search ................................. 360/103, 75, 69

[56] References Cited

U.S. PATENT DOCUMENTS

| | | | |
|---|---|---|---|
| 4,345,278 | 8/1982 | Double | 360/2 |
| 5,510,939 | 4/1996 | Lewis | 360/78.09 |
| 5,521,772 | 5/1996 | Lee et al. | 360/69 |
| 5,566,148 | 10/1996 | Takahara et al. | 369/32 |
| 5,587,857 | 12/1996 | Voldman et al. | 360/103 |
| 5,623,464 | 4/1997 | Tani | 369/44.28 |

Primary Examiner—Robert S. Tupper
Attorney, Agent, or Firm—Westman, Champlin & Kelly, P.A.

[57] ABSTRACT

A data storage system head slider and a method of making the same are disclosed. The head slider includes a slider body and an accelerometer formed integrally with the slider body. In preferred embodiments, the accelerometer includes a cavity formed in the slider body. A structural beam extends over the cavity such that the structural beam deflects in response to acceleration of the head slider. A piezo transducer formed on the structural beam provides a transducer output signal indicative of a magnitude of the acceleration of the head slider.

11 Claims, 5 Drawing Sheets

5,856,895

INTERNAL ACCELEROMETER FOR IMPROVED SERVO PERFORMANCE AND SHOCK SENSING ON HIGH PERFORMANCE DISC DRIVE HEADS

BACKGROUND OF THE INVENTION

The present invention relates generally to data storage system head sliders. More particularly, the present invention relates to a head slider having an internal accelerometer for providing improved servo performance and shock sensing.

In magnetic disc drive data storage devices, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. When the transducer is a magnetoresistive (MR) type sensor, the combination of the slider and the transducer are frequently referred to as an MR head. The heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly several microinches above the disc surface.

The performance of disc drives is highly dependent upon the performance of the track following servo system. Conventional disc drives use a position only feedback system. As the magnetic track widths are reduced, it becomes increasingly difficult for the servo system to perform. If the servo is overdamped, the response time is compromised. If the servo is underdamped, servo over shoot can occur causing degraded servo performance.

It is possible to use the actuator input current as a measure of force and acceleration. However, the actuator coil is located at the end of the load arm carrying the recording head. Along this distance, there are mechanical loss points due to hysteresis and stick slip (the force required to overcome static friction before the bearings move). Therefore, better methods of measuring force and acceleration of the head slider are desired.

Currently, some disc drives such as those used in mobile computer applications are built with shock sensors in the drive to provide data integrity. For example, if the disc drive is given a mechanical shock during operation, it is possible that data will be incorrectly written on the disc. The shock, if large enough, can cause the head to move off track. If the disc drive is writing data at the time of the shock, the head will write this data over an adjacent track. Then, when an attempt to retrieve the data is made, it will not be found in the intended location. Additionally, it is likely that the data will have been written in an area where other data previously existed. To prevent this occurrence, the mobile class of disc drives incorporate the separate shock sensors into the disc drive.

SUMMARY OF THE INVENTION

A data storage system head slider and a method of making the same are disclosed. The head slider includes a slider body and an accelerometer formed integrally with the slider body. In preferred embodiments, the accelerometer includes a cavity formed in the slider body. A structural beam extends over the cavity with one end free such that the structural beam deflects in response to acceleration of the head slider. A piezo transducer formed on the structural beam provides a transducer output signal indicative of a magnitude of the acceleration of the head slider.

DETAILED DESCRIPTION OF THE PREFERRED EMBODIMENTS

The present invention includes a head slider having a sensor for providing a direct measurement of disc head acceleration to improve servo bandwidth and performance. The acceleration signal from the sensor on the head slider allows the servo algorithm of the disc drive to use the head position, head velocity, and head acceleration to improve servo performance. The acceleration signals are provided by building an accelerometer directly into the recording head. The design and fabrication of this acceleration sensor provides a direct measure of head shock that may occur in some applications, particularly in the mobile computing market.

Figure 1:
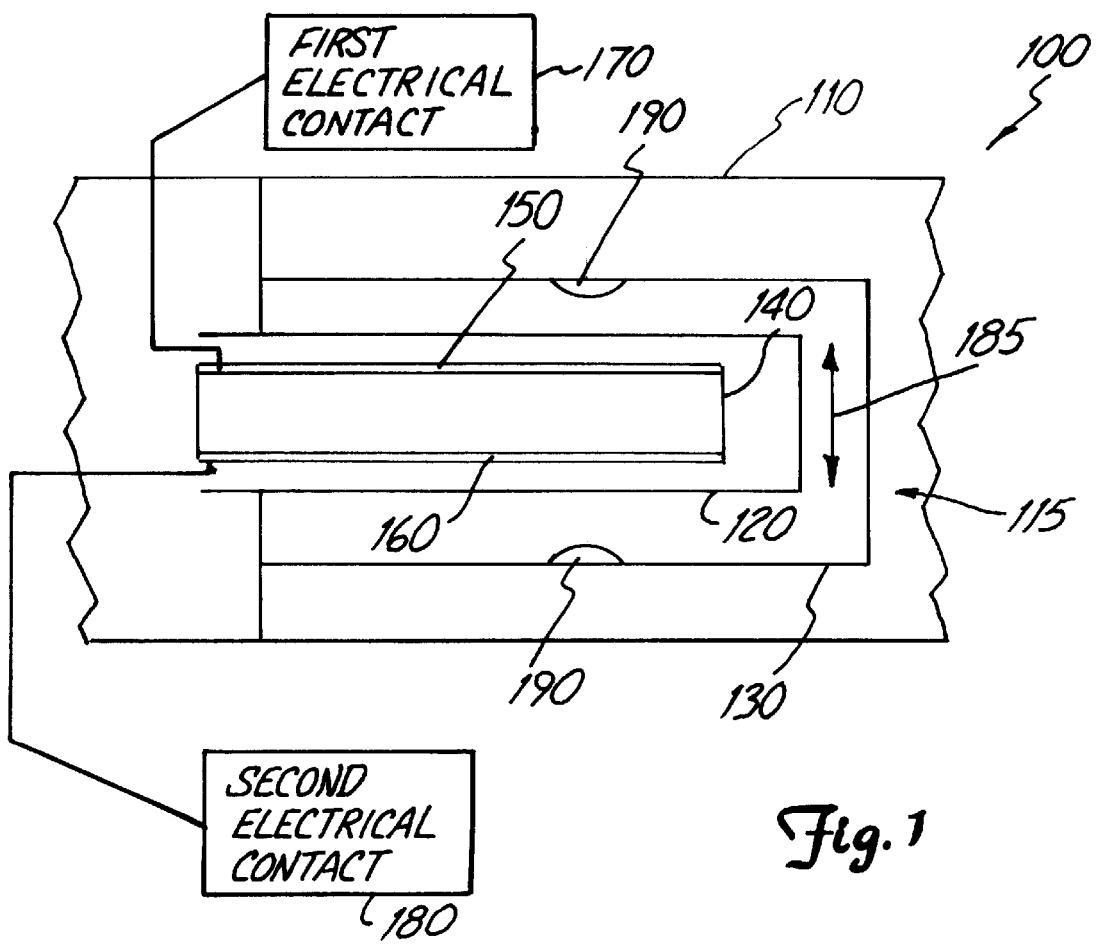
FIG. 1 is a diagrammatic top view of an accelerometer formed integrally within a head slider in accordance with preferred embodiments of the present invention.

FIG. 1 illustrates a portion of head slider 100 having an integrated accelerometer formed therein. Head slider 100 includes slider body 110 and accelerometer 115. Accelerometer 115 includes beam 120 formed within or over cavity 130 and having piezo transducer (PZT) 140 formed on beam 120. PZT 140 can be a piezoresistive or a piezoelectric transducer, for example. Accelerometer 115 also includes accelerometer contacts 150 and 160 formed adjacent the sides of the PZT 140. First and second electrical contacts or bondpads 170 and 180 located on a surface of slider body 110 are electrically and operationally coupled to contacts 150 and 160 of accelerometer 115. Using electrical contacts 170 and 180, movement of beam 120, and thus of PZT 140, in the directions indicated by arrow 185 within or over cavity 130 can be detected. Thus, an indication of the acceleration of head slider 100 can be determined. Bumps or features 190 can optionally be included in cavity 130 to limit the range of deflection motion of beam 120.

Figure 2:
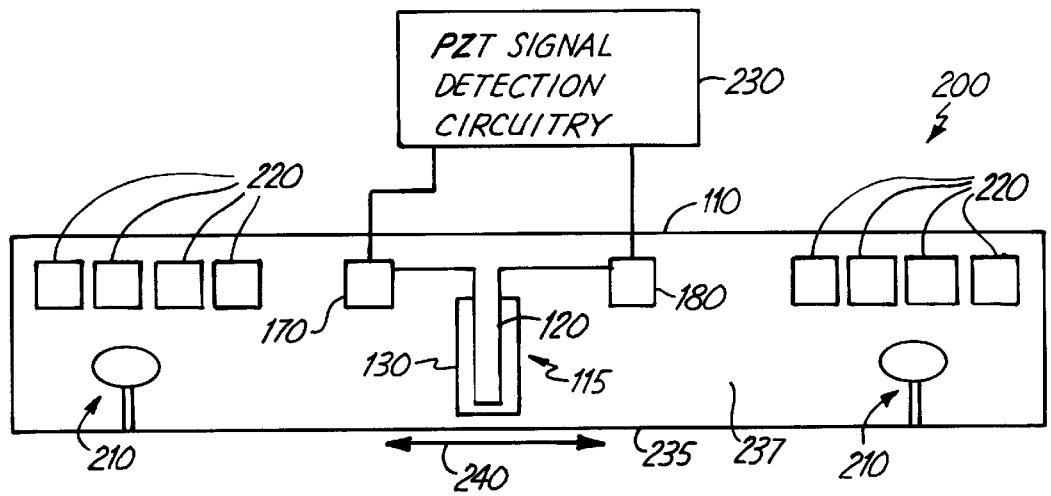
FIG. 2 is a diagrammatic trailing edge view of a head slider having an integrated accelerometer in accordance with first preferred embodiments of the present invention.

FIG. 2 is a trailing end view of head slider 200 in accordance with first preferred embodiments of the present invention. Head slider 200 includes slider body 110 and accelerometer 115 formed integrally within slider body 110. Accelerometer 115 is illustrated as beam 120 formed within cavity 130. However, accelerometer 115 will preferably actually include all of the accelerometer elements shown in FIG. 1. Head slider 200 also includes read/write transducers 210 formed near the corner between air bearing surface (ABS) 235 and trailing edge face 237 of slider body 110. Also, head slider 200 includes bondpads 220 electrically coupled to transducers 210 in a known manner.

As illustrated in FIG. 2, the longitudinal directions of cavity 130 and beam 120 are oriented substantially perpendicular to ABS 235 such that lateral accelerations and decelerations of head slider 200 will result in beam 120 deflecting in the directions indicated by arrow 240 within cavity 130. Thus, in head slider 200, accelerometer 115 is oriented or configured such that it detects lateral accelerations of the head slider. PZT signal detection circuitry 230 is coupled to bondpads 170 and 180 in order to detect PZT signals from accelerometer 115. While only shown in FIG. 2, PZT signal detection circuitry 230 is coupleable to bondpads 170 and 180 of all of the preferred embodiments of the present invention.

Figure 3:
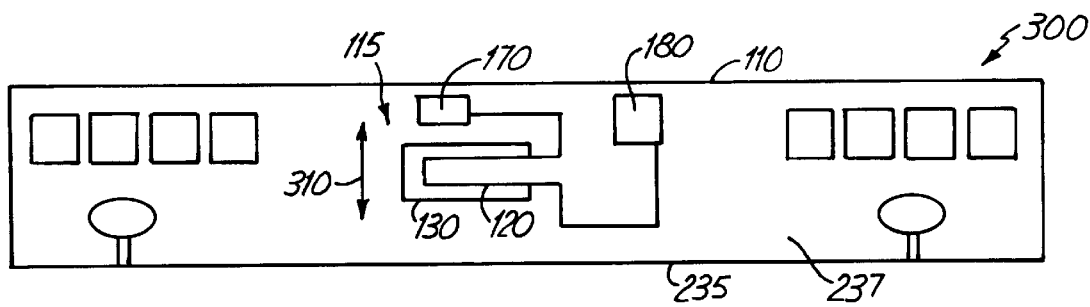
FIG. 3 is a diagrammatic trailing edge view of a head slider having an integrated accelerometer in accordance with second preferred embodiments of the present invention.

FIG. 3 is a trailing edge view of head slider 300, in accordance with alternate embodiments of the present invention, having accelerometer 115 oriented such that it is adapted to detect vertical accelerations and decelerations of head slider 300. As such, beam 120 extends longitudinally within or over cavity 130 in a direction which is generally parallel to ABS 235. Thus, vertical accelerations and decelerations of head slider 300 result in deflection of beam 120 generally in the directions indicated by arrow 310. The resulting PZT signals from PZT 140 (shown in FIG. 1) on beam 120 are provided to bondpads 170 and 180 for the detection of vertical accelerations.

Figure 4:
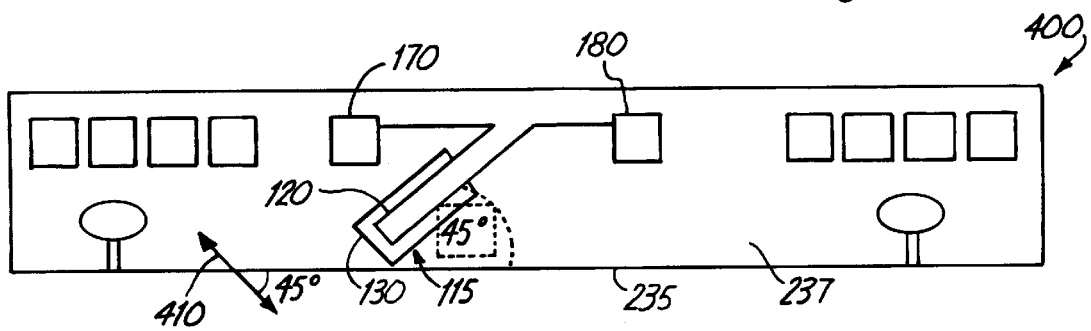
FIG. 4 is a diagrammatic trailing edge view of a head slider having an integrated accelerometer in accordance with third preferred embodiments of the present invention.

FIG. 4 is a trailing edge view of head slider 400 in accordance with alternate embodiments of the present invention. Head slider 400 includes accelerometer 115 oriented such that it detects both vertical and lateral accelerations of the head slider. In this respect, beam 120 of accelerometer 115 extends longitudinally within or over cavity 130 in a direction which forms an angle of approximately 45 degrees with ABS 235. Thus, acceleration and deceleration of head slider 400 which causes beam 120 to deflect within cavity 130 in directions generally indicated by arrow 410 can be detected as PZT signals via bondpads 170 and 180. In this instance, the PZT signals will correlate to the vertical and lateral accelerations as a function of the relationship shown below in Equation 1.

Equation 1

$$\text{PZT signal } \alpha(0.707*\text{Vert accel} + 0.707*\text{Lat accel})$$

Figure 5:
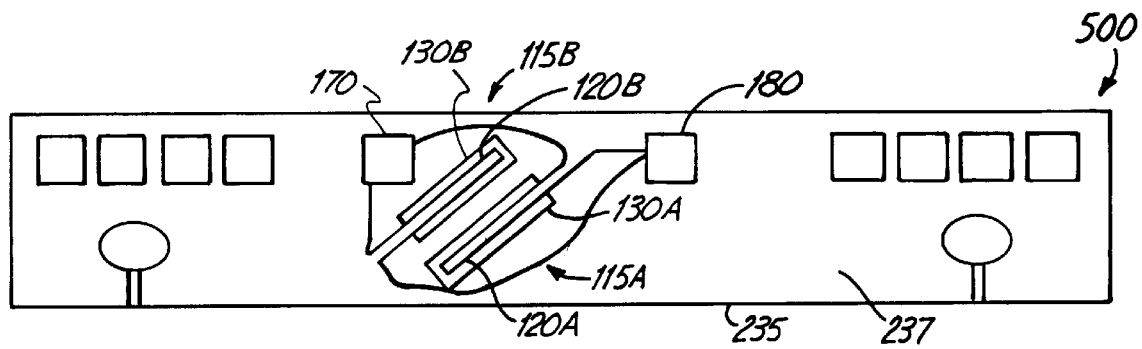
FIG. 5 is a diagrammatic trailing edge view of a head slider having integrated accelerometers in accordance with fourth preferred embodiments of the present invention.

FIG. 5 is a trailing edge view of head slider 500 in accordance with alternate embodiments of the present invention. Like head slider 400, head slider 500 is adapted to detect both vertical and lateral accelerations of the head slider. Head slider 500 includes two accelerometers 115A and 115B, cooperatively coupled and each oriented to detect both vertical and lateral accelerations. Beam 120A of accelerometer 115A extends within cavity 130A in a direction which forms a 45 degree angle with ABS 235. Thus, accelerometer 115A is oriented the same as accelerometer 115 of head slider 400 discussed above. Beam 120B of accelerometer 115B extends within cavity 130B in a direction which is opposite the direction of extension of beam 120A. The electrical contacts (150 and 160 as shown in FIG. 1) of each of accelerometers 115A and 115B are electrically coupled to bondpads 170 and 180 so that the output signals provided by the two accelerometers are combined. Thus, the PZT output signal detected at bondpads 170 and 180 correlates, with increased signal amplitude, to the vertical and lateral accelerations of head slider 500 as shown in Equation 2.

Equation 2

$$\text{PZT signal } \alpha(1.414*\text{Vert accel} + 1.414*\text{Lat accel}).$$

Figure 12:
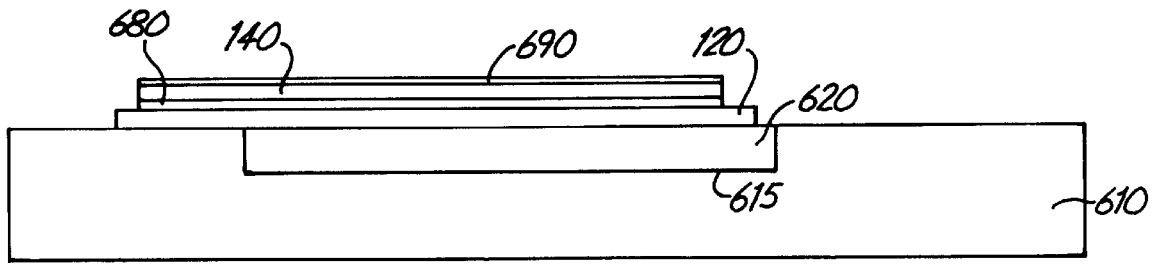
FIG. 12 is a diagrammatic illustration of some steps of an alternate method of fabricating an integrated accelerometer in accordance with alternate embodiments of the present invention.
Figure 13:
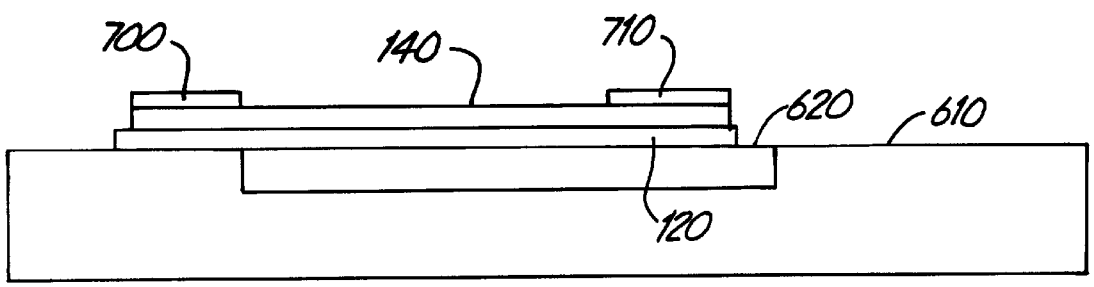
FIG. 13 is a diagrammatic illustration of some steps of an alternate method of fabricating an integrated accelerometer in accordance with still other embodiments of the present invention.

FIGS. 6–11 illustrate various steps of a method or a process of fabricating the accelerometers of the present invention onto a wafer prior to the read/write transducer fabrication of head sliders on the wafer. FIGS. 12 and 13 illustrate alternate steps which can be substituted into the method in order to fabricate accelerometers having alternate designs, as will be discussed below in greater detail. In general, the fabrication process steps described below are of the type which are well known in the art. Further, various alternative designs and process steps follow from the invention.

An optimized accelerometer of the present invention is determined through a combination of process and sensitivity optimizations. Depending on the performance needs of the particular application, the use of a piezoresistive or piezoelectric sensor or transducer can be used. To simplify the following discussion, the fabrication techniques described are for the piezoelectric type sensor.

Figure 6:
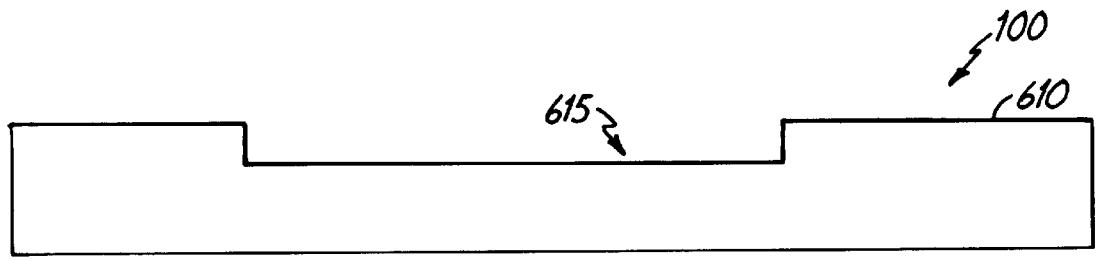
FIG. 6 is a diagrammatic illustration of a first step in a method of fabricating an integrated accelerometer in accordance with preferred embodiments of the present invention.

FIG. 6 illustrates a first step in the preferred method of fabricating the accelerometers of the present invention. As illustrated in FIG. 6, well or cavity 615 is etched into a portion of the head slider 100 where the accelerometer 115 is to be located. In preferred embodiments, well 615 is etched into alumina basecoat 610 on the head slider. However, in other possible embodiments, well 615 is etched into the ceramic substrate of the head slider. In a preferred embodiment, well 615 is formed by ion etching into the alumina basecoat. However, in other possible methods of fabricating the accelerometers of the present invention, well 615 is formed by wet etching.

Figure 7:
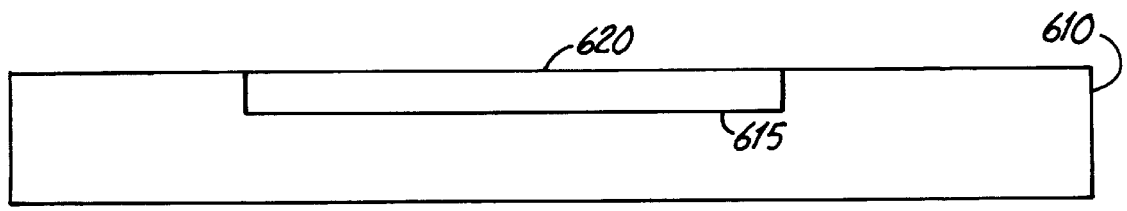
FIG. 7 is a diagrammatic illustration of a second step in a method of fabricating an integrated accelerometer in accordance with preferred embodiments of the present invention.
Figure 8:
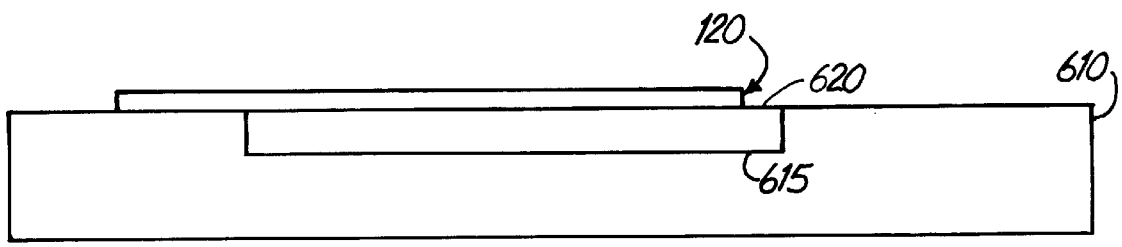
FIG. 8 is a diagrammatic illustration of a third step in a method of fabricating an integrated accelerometer in accordance with preferred embodiments of the present invention.

Next, as illustrated in FIG. 7, well 615 is filled with a removable material using known deposition techniques. For example, material 620 filling well 615 can be Poly Silicon Glass or Photoresist. Next, as illustrated in FIG. 8, structural beam 120 is deposited and patterned on portions of material 610 (e.g., on portions of alumina basecoat 610) and on portions of material 620. As will be discussed below in greater detail, structural beam 120 should cover at least portions of one end of material 620, but should not extend all the way to the other end of material 620. In preferred embodiments, structural beam 120 is made from $Si_3N_4$.

Figure 9:
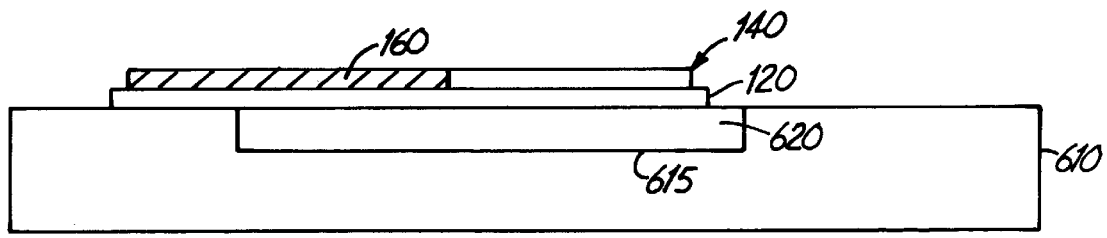
FIG. 9 is a diagrammatic illustration of fourth and fifth steps in a method of fabricating an integrated accelerometer in accordance with preferred embodiments of the present invention.

Next, as illustrated in FIG. 9, PZT 140 is deposited and patterned on top of structural beam 120. Preferably, deposition of the PZT film is accomplished using a spin coating method of deposition in which the wafer is spun while the PZT material is deposited. However, PZT 140 can also be deposited using other deposition methods such as a screen print deposition. PZT 140 also undergoes standard PZT fabrication processes such as a dehydrate bake and an anneal at approximately 700° C. in order to achieve the proper crystal orientation.

Next, contacts 150 and 160 (contact 150 is shown in FIG. 1) are preferably deposited on the edges of PZT 140. After deposition of contact metal layers 150 and 160, which can be for example Ti, contacts 150 and 160 are patterned and etched. In preferred embodiments, the contact metal is completely removed from the top and ends of the PZT layer 140. For ease of illustration, contact 160 is shown (hatched portion) as extending only a portion of the length of PZT 140. However, in preferred embodiments, each of contacts 150 and 160 are formed on top of structural beam 120 such that they extend substantially the entire length of PZT 140, as shown in FIG. 1.

To increase the response of the accelerometer to lateral and vertical motion, it is preferred that the contacts of the accelerometer be fabricated on the edges of the PZT material rather than on the top and bottom of the accelerometer. This can be accomplished using a Chemical Vapor Deposition process (CVD). The CVD process is a non-directional material deposition process whereby films, in this case a metal conductor film, are deposited conformaly over all exposed surfaces. This provides excellent vertical wall coverage which is required to fabricate the conductors on the edges of the sensor (other typical PZT processes would have the conductors deposited on the top and the bottom of the PZT material). To complete the fabrication process, the metal contact film is removed from the ends and top of the PZT sensor. This is easily accomplished by using photo lithography and etching (by dry etching such as plasma ashing or ion milling or by wet etching using selective etchants). The area where the film is to remain is protected with photo resist.

Alternatives to the edge contact metals include the traditional contact metals on the top and bottom of the PZT film. Due to the directional nature of the PZT material the response will be significantly reduced. An additional alternative is to fabricate the two contacts on the top of the PZT film. Again, in this case, the signal will be significantly reduced. However the process simplicity may make this a better overall solution. As stated previously, the final accelerometer design will be determined by the best trade offs of performance and process simplicity/robustness.

Figure 10:
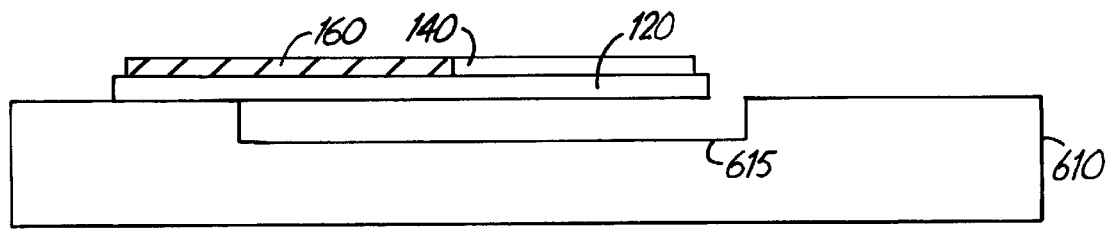
FIG. 10 is a diagrammatic illustration of a sixth step in a method of fabricating an integrated accelerometer in accordance with preferred embodiments of the present invention.
Figure 11:
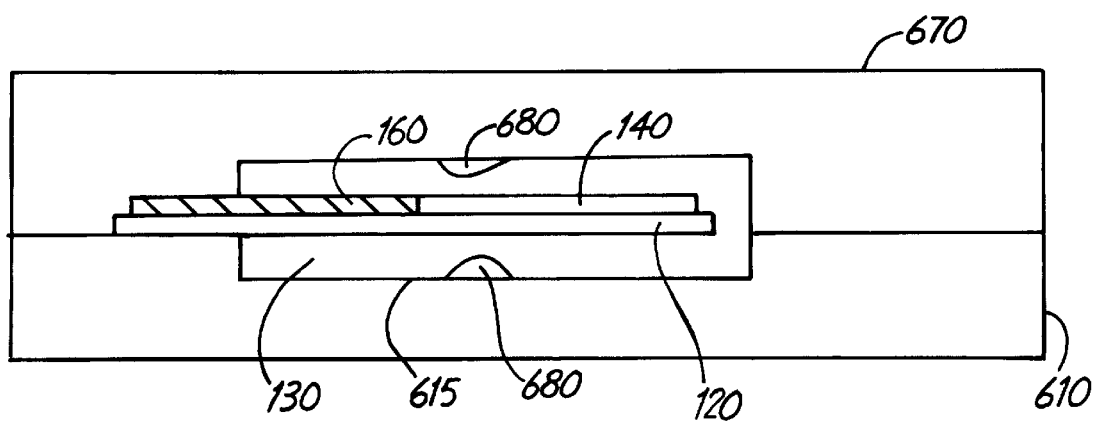
FIG. 11 is a diagrammatic illustration of a seventh step in a method of fabricating an integrated accelerometer in accordance with preferred embodiments of the present invention.

Next, as illustrated in FIG. 10, material 620 is removed from well 615 to allow beam 120 to deflect. Removal of material 620 can be accomplished using any of a variety of known techniques. For example, if material 620 is photoresist, removal of material 620 can be accomplished using a lift-off process.

As shown above, to improve the structural integrity of the PZT sensor, the PZT film is typically deposited on top of a structural member ($Si_3N_4$ as an example). This structural beam can also be shaped to provide a mass to increase the strain on the PZT element. The increased strain will increase the signal output of the sensor during an acceleration input.

The design of the well under the beam can be optimized to provide damping using air channels and also the range of travel of the beam can be constrained through the use of stops (bumps) fabricated into the well. The damping and range must be optimized to provide the necessary acceleration signal without allowing the sensor to be damaged during operation.

Finally, cap layer 670 can be formed over the accelerometer to provide protection and plannarization before the beginning of the read/write transducer fabrication process. For example, cap layer 670 can be deposited before the beginning of the magnetic transducer fabrication in magnetic read/write transducer head sliders. Well 615 defines at least a portion of cavity 130 in which beam 120 (and thus PZT 140) deflects during acceleration. In the particular embodiment illustrated in FIG. 11, acceleration and deceleration of the head slider results in beam 120 deflecting in directions generally illustrated as being perpendicular with the plane of page. Bumps or features 680 can optionally be included to limit the range of motion of the beam and PZT sensor. Also, bumps can be included to limit the deflection of the beam in the directions generally perpendicular to the plane of the page.

As discussed above, in addition to the edge contact PZT design, there are several other contact alternatives, two of which are described below. The final selection of the optimal contact methodology should be determined by a trade-off between the process efficiency and output response for the particular application. As illustrated in FIG. 12, a traditional PZT contact design can be used. In this case, contacts 680 and 690 (corresponding to contacts 150 and 160) are fabricated below and on top of PZT layer 140. This type of contact configuration can be fabricated with standard fabrication techniques. While this type of contact methodology can be used, the PZT output signal response is optimized for movement up or down, but not side to side. Typically, the response from a side-to-side acceleration would be one third of the magnitude of the response from an up and down acceleration.

As illustrated in FIG. 13, an upper contact only design can be used as well. Using this design, two contacts 700 and 710 are fabricated on top of PZT film 140. In this type of design, the PZT signal comes primarily from the top surface or layer(s) of the PZT film 140. The response of this connection scheme is expected to be the lowest of the three connection schemes discussed. However, the fabrication process for this connection scheme is by far the easiest.

An advantage of the present invention is the ability to mass fabricate micro shock and acceleration sensors at the wafer level. This results in a low overall cost to manufacture and in significant savings. Additionally, the accelerometer of the present invention is internal to the flying head slider, and has little or no influence on the flying performance. Furthermore, the reliability and performance of the accelerometer is improved because the PZT 140 is embedded in the flying head. There are multiple fabrication techniques which can be used to fabricate the PZT accelerometer. One technique includes sputtering or evaporation of the PZT material on a wafer Other techniques include a wet process in which the PZT material is fabricated using a sol gel process (spin, dehydrate and baking of the PZT solution) or a screen printing process (coat, dehydrate and bake the PZT solution).

Having a sensor which determines the acceleration of the recording head and which is located directly on the recording head eliminates all the mechanical components normally associated with this type of measurement. This allows the servo damping to be reduced which increases the bandwidth of the servo. Also, the ability to measure the recording head acceleration allows the servo scheme to be improved such that it uses an integrated servo scheme in addition to the position servo scheme. The term "integrated servo scheme" is intended to identify a servo system which controls the position of the head based upon acceleration, velocity and position. This is applicable during the track following and track seeking operations. Improved track seeking performance will also improve the disc drive performance.

The accelerometer of the present invention also provides feedback information on external shocks to the disc drive to prevent data corruption. Numerous other advantages of the present invention include the fact that the wiring connection on the integrated head is made in the same fashion as of the wiring connections of the read/write transducers. The two additional leads for the accelerometer are easily accommodated through wires or flex connections. The manufacturing efficiencies of the integrated accelerometer head results in a much lower cost test head than other fabrication techniques. Also, with the accelerometers of the present invention, the conventional external shock sensors can be eliminated from disc drives, thus resulting in a cost savings. The improved servo performance provided by the present invention will result in a higher track density which is necessary for the continued increase in data stored per area of disc surface. Further, the improved servo performance will result in improved access time in the disc drive.

Although the present invention has been described with reference to preferred embodiments, workers skilled in the art will recognize that changes may be made in form and detail without departing from the spirit and scope of the invention.

What is claimed is:

1. A data storage system head slider comprising:
   a slider body; and
   an accelerometer formed integrally with the slider body, wherein the accelerometer comprises:
      a cavity formed in the head slider;
      a structural beam formed in the head slider and extending into the cavity such that the structural beam deflects in response to acceleration of the head slider; and
      a piezo transducer formed on the structural beam such that deflection of the structural beam within the cavity causes the piezo transducer to provide a transducer output signal indicative of a magnitude of the acceleration of the head slider.

2. The head slider of claim 1, wherein the accelerometer is formed at the trailing edge face of the head slider.

3. The head slider of claim 1, wherein the piezo transducer formed on the structural beam is a piezoelectric transducer.

4. The head slider of claim 3, wherein the piezoelectric transducer comprises:
   a piezoelectric film formed on the structural beam; and
   a first and second contacts formed adjacent to and in contact with the piezoelectric film, wherein the first and second contacts are operationally coupled to first and second bond pads on a surface of the head slider so that the transducer output signal from the piezo transducer is provided to external circuitry.

5. The head slider of claim 4, wherein the structural beam and the piezo transducer formed on the structural beam extend longitudinally in the cavity in a direction which causes the accelerometer to detect lateral acceleration of the head slider.

6. The head slider of claim 4, wherein the structural beam and the piezo transducer formed on the structural beam extend longitudinally in the cavity in a direction which causes the accelerometer to detect vertical acceleration of the head slider.

7. The head slider of claim 4, wherein the structural beam and the piezo transducer formed on the structural beam extend longitudinally in the cavity in a direction which causes the accelerometer to detect both lateral and vertical accelerations of the head slider.

8. The head slider of claim 4, wherein the first and second contacts are formed on the structural beam substantially coplanar with the piezoelectric film.

9. The head slider of claim 4, wherein at least one of the first and second contacts are formed on top of the piezoelectric film.

10. The head slider of claim 1, wherein the piezo transducer formed on the structural beam is a piezoresistive transducer.

11. A magnetic head slider for use in a magnetic data storage system, the magnetic head slider comprising:
    a slider body;
    an accelerometer formed on the slider body and detecting acceleration of the magnetic head slider relative to a surface of a magnetic disc, wherein the accelerometer comprises:
       a cavity formed in the slider body;
       a structural beam formed on the slider body such that it extends over the cavity and can deflect in response to acceleration of the head slider;
       a piezo transducer formed on the structural beam such that deflection of the structural beam causes the piezo transducer to provide a transducer output signal indicative of a magnitude of the acceleration of the head slider; and
    a first magnetic transducer formed on the slider body.

* * * * *